Jan. 16, 1934.　　　N. W. CUMMINS ET AL　　　1,943,585
DETACHABLE HANDLE FOR COOKING UTENSILS
Filed Nov. 30, 1931　　　2 Sheets-Sheet 1

INVENTORS.
NORMAN W. CUMMINS
JOHN ADOLPH JOHNSON
BY *John L. Milton*
ATTORNEY.

Jan. 16, 1934. N. W. CUMMINS ET AL 1,943,585
DETACHABLE HANDLE FOR COOKING UTENSILS
Filed Nov. 30, 1931  2 Sheets-Sheet 2

Inventors.
NORMAN W. CUMMINS
JOHN ADOLPH JOHNSON

By John L. Milton
Attorney

Patented Jan. 16, 1934

1,943,585

UNITED STATES PATENT OFFICE 1,943,585

DETACHABLE HANDLE FOR COOKING UTENSILS

Norman W. Cummins and John Adolph Johnson, Louisville, Ky.

Application November 30, 1931
Serial No. 577,976

5 Claims. (Cl. 16—114)

This invention is an improvement in culinary utensils especially organized for the purpose of providing same with a stub handle and also to provide a removable handle having means for engaging with the stub handle so that the removable handle may be at all times retained in a cool condition and further whereby a larger number of utensils may be disposed within a given area of space such as in an oven or upon the top surface of the stove than is possible with the usual utensils provided with fixed handles.

Another object is to fashion the component parts so that all surfaces may be readily cleaned and wherein there will be no fixed cracks to accumulate foreign matter.

A further object is to provide a complete utensil that can readily be manufactured into a permanent organized whole and at a low cost.

A still further object of the invention is to provide a utensil and a separable handle wherein the latter can readily be attached as when effecting the engagement of the utensil when disposed in a hot oven.

With the above and other objects in view the invention consists in the improved construction and arrangements of parts to be hereinafter more particularly described, claimed and illustrated in the accompanying drawings, in which—

Figure 1:
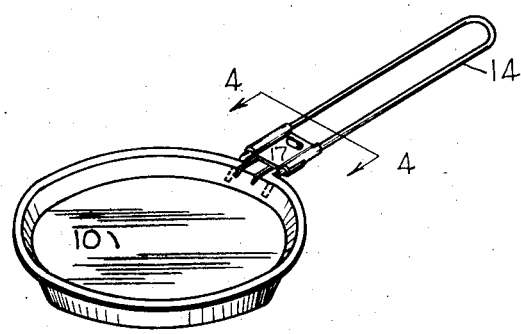
Figure 2:
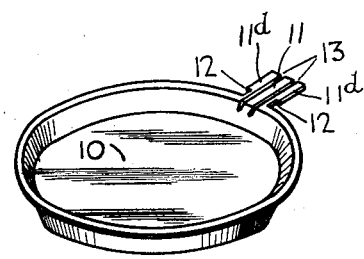
Figure 3:
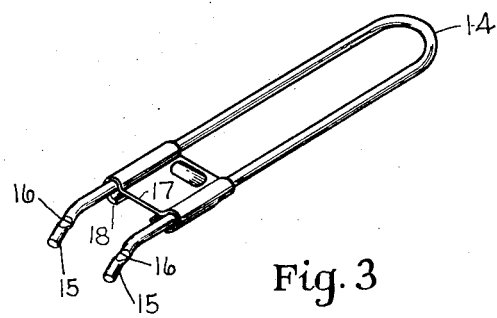
Figure 4:
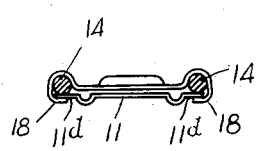
Figure 5:
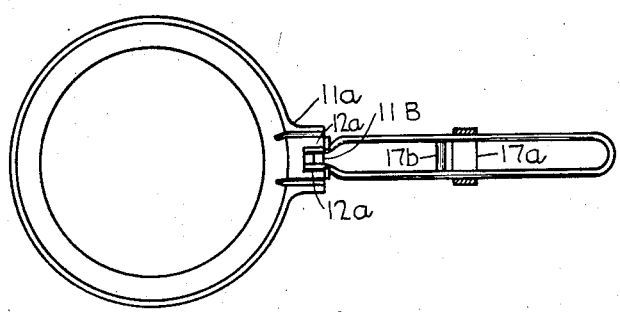
Figure 6:
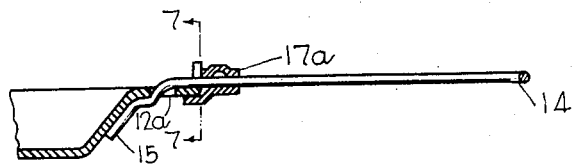
Figure 7:
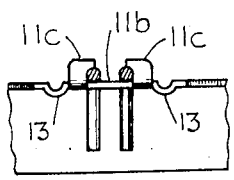

Figure 1 is a perspective view of the complete utensil assembled with the handle. Fig. 2 is a perspective view of the utensil and stub handle as an integral unit. Fig. 3 is a perspective view of the handle. Fig. 4 is a cross-sectional view of the handle along the line 4, 4 of Fig. 1. Fig. 5 is a plan view of a modified form of the complete utensil. Fig. 6 is a cross-sectional longitudinal view of a portion of Fig. 5, while Fig. 7 is a cross-sectional view of Fig. 6 along the line 7, 7. The slide member 17a being entirely omitted for the purpose of clearness.

Referring to the drawings 10 designates the bowl or body member of the cooking utensil constructed of any desired sheet material and having a stub handle 11 integrally formed on the bowl and fashioned with notches 12, 12; and a pair of depressions form reinforcing grooves 13 to incorporate sufficient strength into the stub handle or extension to dispense with the usual auxiliary reinforcing member and the complication of attaching same. Handle 14 is fashioned with depending arms 15, 15 provided with notches 16, 16 so as to conform to the contour of the outer surface of the bowl and rim when disposed in notches 12, 12 as shown in Fig. 1. Attention is called to the fact that these depending arms extend for the height of the outer surface of the bowl and that the notches enable the round wire handle to fit in closely to the rim, all of which makes for a simple and rigid structure. By broadening the stub handle holes can be made in place of notches 12, 12.

On to the parallel members of the handle 14 is disposed a jaw gripping slide member 17 which carries a pair of jaws 18, 18 which engage and interlock or grip the stub handle 11 which has laterally extending wings 11d when the jaw gripping slide member is pressed forward or in the direction of the bowl, as shown in Fig. 1, thus forming a very secure assemblage, in fact, quite equal to being permanently united. This assembly can be effected without securing or holding the bowl member by hand. All that is necessary is for the user to have the handle in hand and engage the depending arms in the notches when the utensil can be lifted or the slide 17 can be pushed forward and complete the attachment, all of which can easily be effected when the utensil is carrying a high degree of heat. The operation is reversed for disassembling. It will be seen that the same handle can be used for a number of utensils and that with the handle removed a greater number of vessels can be disposed within a given area than if the handles were permanently attached.

In the modified structure shown in Figs. 5, 6 and 7 the same general thought is applied, however, slightly altered, the depending arms being formed substantially the same as previously described, however, they are disposed closer together solely for the purpose of being able to fashion the stub handle within lesser dimensions. In this structure instead of a pair of external notches a unitary slot with internal notches 12a is shown for receiving the depending arms. With the portion 11b of the stub handle removed a pair of notches will be left remaining. The slide 17a of the modified structure is formed with a broad tongue 17b for interlocking with the stub handle 11a.

The modified structure of the bowl is substantially as described and illustrated in Fig. 2 with the addition of vertically projecting tongues 11c, 11c which can be regarded as hooks for receiving the near or adjacent sections of the handle 14. The formation of the detachable handle for the modified structure is identical with that used in Figs. 1 and 3, except the near ends of the arms are brought closer together to register with the receiving notch or notches of the stub handle. The arms are so arranged that they are constantly and yieldably urged away from each other at all times through the medium of the resilient force of the wire. To attach the handle to the bowl the arms are squeezed until the ends are adjacent, when they can be readily inserted in the notch or notches and then advanced to the position shown in Fig. 6, they are now released to respond to the resilient force, which causes them to engage notches 12a, 12a and the hooks 11c, 11c and thereby effect a substantial attachment.

To protect against a chance disengagement, slide 17a is provided, however, it can be dispensed with and still leave a practicable device.

Many applications and modifications of this invention are possible without departing from the basic principle, therefore, we wish to be limited only by the attached claims.

We claim:

1. In a utensil fashioned with an integral extension provided with wings, a removable handle, the attaching or inner end of which has a pair of spaced parallel depending free arms adapted to engage and contact the surface of said utensil, said handle being equipped with a sliding jaw member adapted to cooperate with said wings and slidably wedge said handle onto said extension.

2. In a utensil fashioned with an integral extension, a removable handle, the attaching or inner end of which has a pair of spaced parallel depending free arms adapted to engage and contact the surface of said utensil, said handle being equipped with a sliding jaw member adapted to cooperate with said extension and bind said handle onto said extension, without disturbing the parallel relation of said arms.

3. In a utensil fashioned with an integral extension, a removable handle, which has a pair of guide members and spaced parallel depending free arms adapted to engage and contact the surface of said utensil, said guide members being equipped with a sliding jaw member adapted to cooperate with said extension and bind said handle to said extension without disturbing the parallel relation of said arms.

4. A utensil lifting means comprising a handle fashioned with a pair of guide members with arms and a sliding jaw member carried by said guide members, said handle being adapted to cooperate with an extension which is affixed to a cooking utensil, said extension being provided with a projection with which said sliding jaw member engages to bind said handle to said utensil, with said arms engaging the exterior surface of said utensil.

5. A utensil lifting means comprising a U formed handle fashioned with a pair of guide members with depending arms having normally free ends and a sliding jaw member carried by said guide members, said handle being adapted to cooperate with an extension which is affixed to a cooking utensil, said extension being provided with wings with which said sliding jaw member engages to bind said handle to said utensil, with said depending arms engaging the exterior surface of said utensil.

NORMAN W. CUMMINS.
JOHN ADOLPH JOHNSON.